Figure 1:
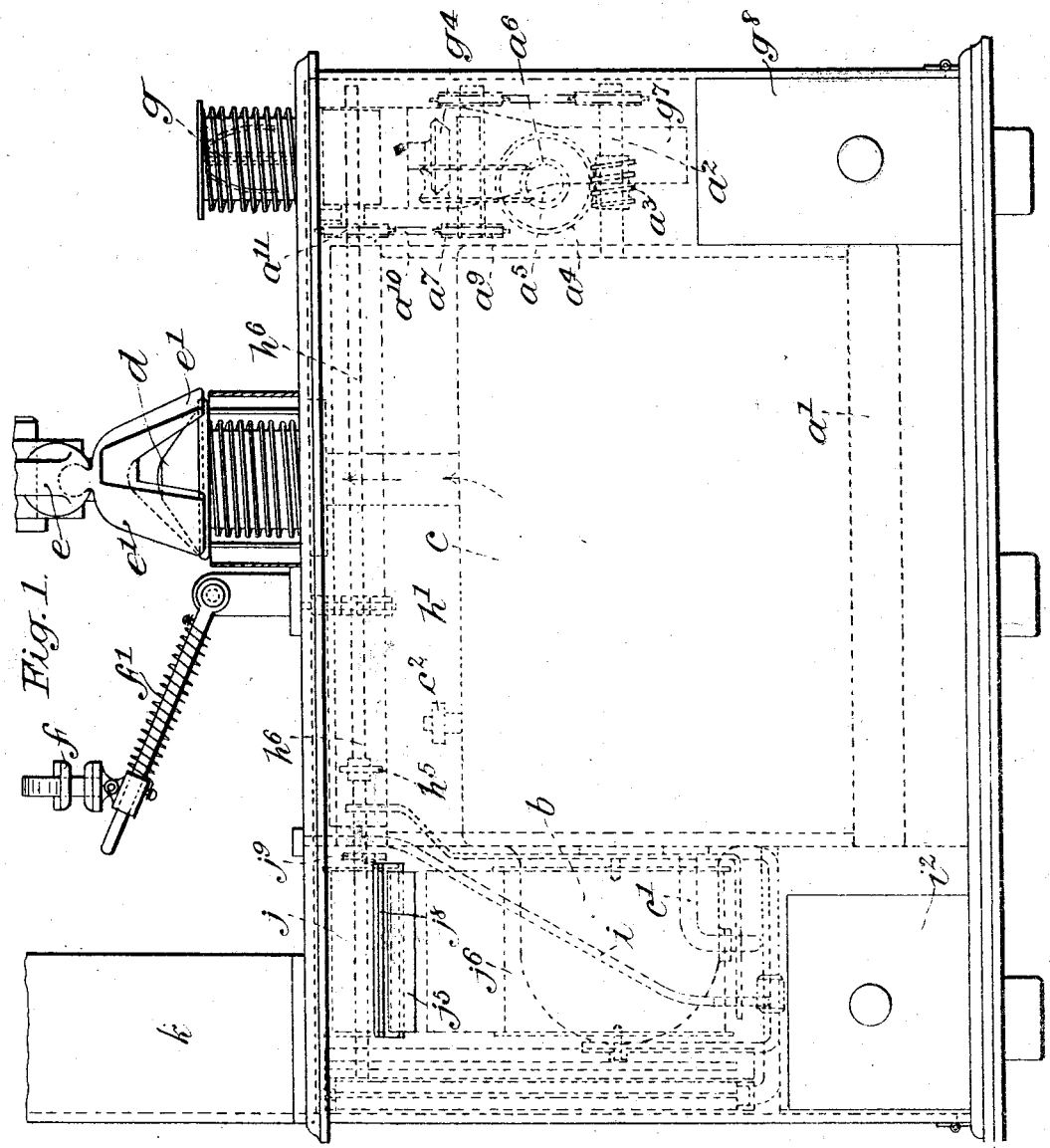

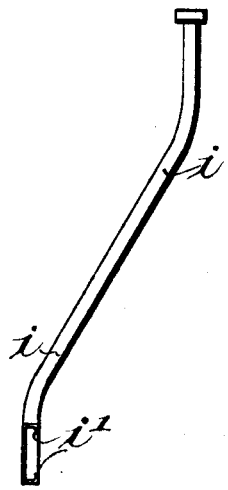
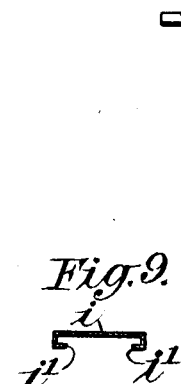
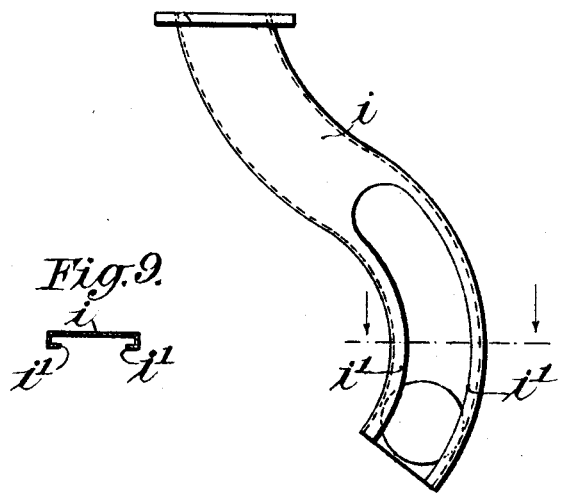
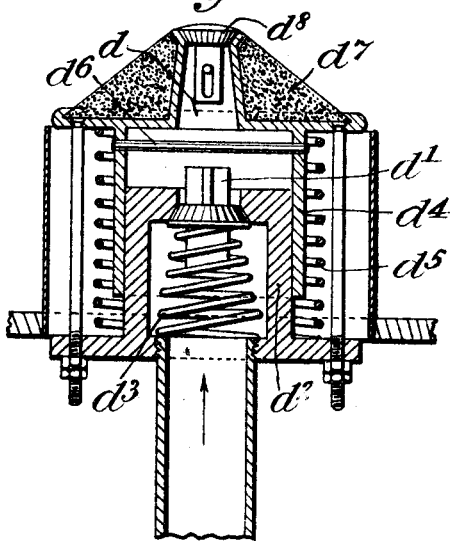
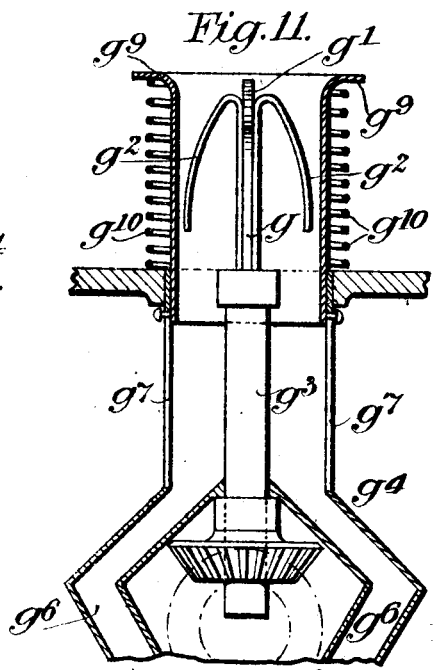

F. H. S. SHEPHERD.
APPARATUS FOR CLEANING TOBACCO PIPES AND THE LIKE.
APPLICATION FILED FEB. 2, 1912.

1,052,759.

Patented Feb. 11, 1913.

6 SHEETS—SHEET 6.

UNITED STATES PATENT OFFICE.

FREDERICK HUDSON SHEPHERD SHEPHERD, OF LONDON, ENGLAND, ASSIGNOR TO AUTOMATIC PIPE CLEANER SYNDICATE LIMITED, OF LONDON, ENGLAND.

APPARATUS FOR CLEANING TOBACCO-PIPES AND THE LIKE.

1,052,759.   Specification of Letters Patent.   Patented Feb. 11, 1913.

Application filed February 2, 1912.   Serial No. 674,949.

*To all whom it may concern:*

Be it known that I, FREDERICK HUDSON SHEPHERD SHEPHERD, a subject of the King of Great Britain and Ireland, residing at 294 Goswell road, London, E. C., England, have invented certain new and useful Improvements in Apparatus for Cleaning Tobacco-Pipes and the Like, of which the following is a specification.

This invention for improvements in apparatus for cleaning tobacco pipes and the like, has for its object to provide a coin freed apparatus that is adapted to scrape the bowl of the pipe, polish the outside of the pipe blow through the pipe air that has been pumped while the scraper and polisher are being operated to blow through the pipe into a refuse receptacle that receives the matter blown out of the pipe, and to deliver a piece of paper to wipe the mouthpiece.

According to this invention, the pipe cleaning machine is driven by a source of power which is set into operation by the insertion of a coin in the coin freed mechanism, which source of power also compresses the air used to clean the stem of the pipe and at the same time to operate the mechanical scraper for cleaning the bowl of the pipe. An electric motor is provided as a source of energy and is coupled directly to a compressor or pump for supplying the compressed air and directly or indirectly to the mechanical scraper. The compressor is connected to the air reservoir which is adapted to hold a sufficient quantity of air for the operation of cleaning a pipe. This reservoir is provided with a safety blow off valve, and is connected to the nozzle to which the pipe is applied. This nozzle may be mounted over a push valve in such a way that when the pipe bowl is pushed down in connection therewith the air is released and passed therethrough. The pipe is placed against the push valve with its stem held between a pair of spring grips and is pressed against the push valve by elastic pads in a double lever provided with a trigger lever that when operated opens a door opening into the refuse receptacle that is provided with a sponge and a deodorant. In a modification the air passes in the mouthpiece through the bowl, a suitable construction being provided for this purpose.

The scraper comprises a pair of expanding steel wings, and is mounted on a motor shaft or connected therewith in such a way that it rotates at a high speed. It is provided with a guard which also serves as a guide, and a resistance to prevent the pipe being put in too fast. In cleaning the pipe bowl, the pipe is placed over the scraper in such a way that the flat steel wings rotate therein, and thus remove all charred matter.

The starting and stopping of the motor is effected by means of a contact device comprising a pair of spring pressed pivoted levers bearing contacts. One of these levers is normally held back against the action of its spring by means of a catch which is adapted to be operated to release the contact on the application of a coin to the coin freed mechanism. The other contact lever is made to bear upon a small cam which is connected through a reducing gear to the motor shaft. Thus the releasing of the one contact lever causes it to close the power circuit with the other, and so start the motor. At the same time the rotation of the small cam pushes both contacts against the action of their springs until the one lever is caught up by the catch after which the cam completes one revolution, and the other contact lever breaks the circuit. The shaft on which the small cam is mounted may also be utilized to operate a counting mechanism which is intended to check the amount of money put into the machine. This shaft may also be connected to a paper feeding mechanism which is adapted to supply a certain amount of paper for the purpose of wiping the mouthpiece.

In a modified form of construction, the exposed working parts or gear are all arranged on the top of the machine, and are normally closed in by a suitable cover, which can be released on the application of the coin to the machine, and be replaced automatically after the operation has been completed.

Figure 2:
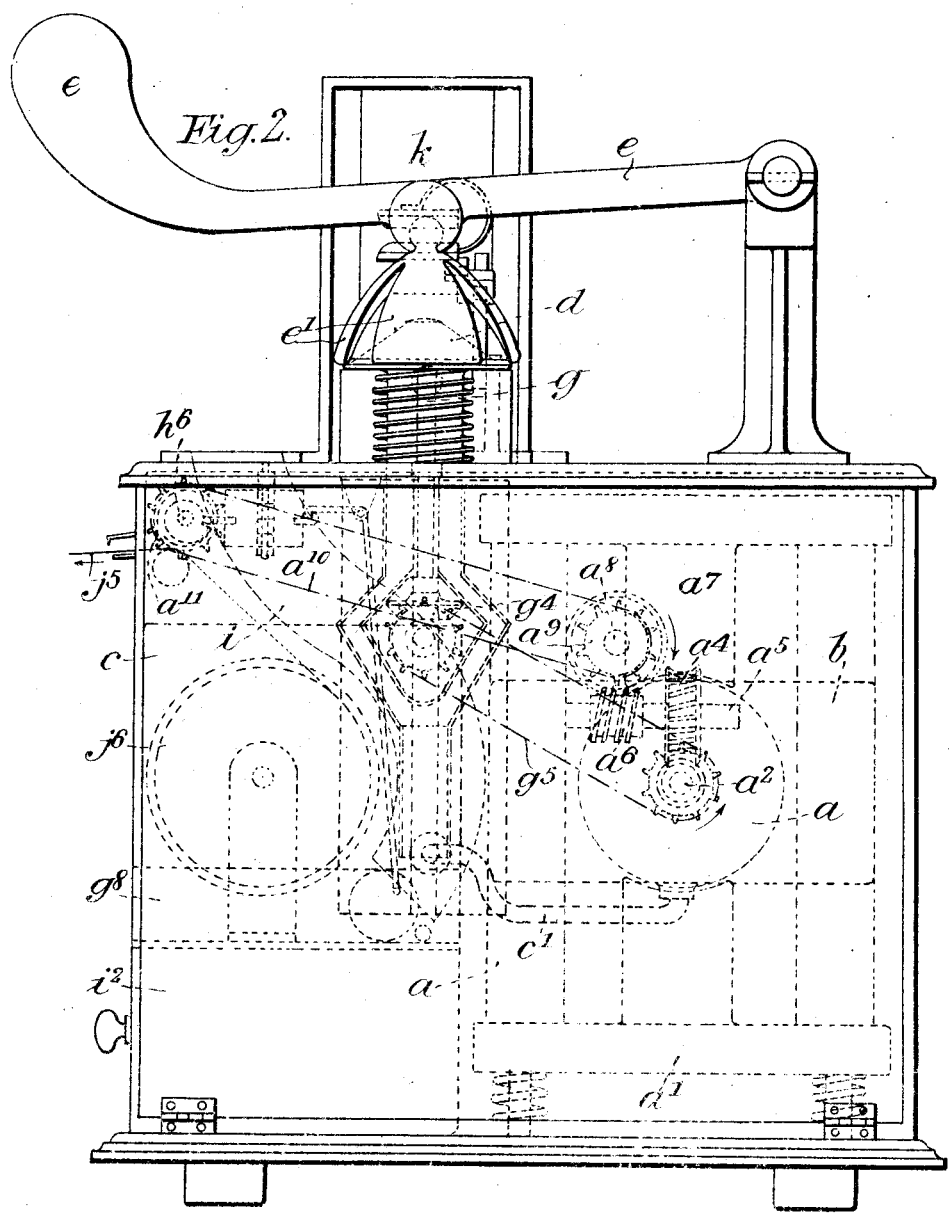
Figure 3:
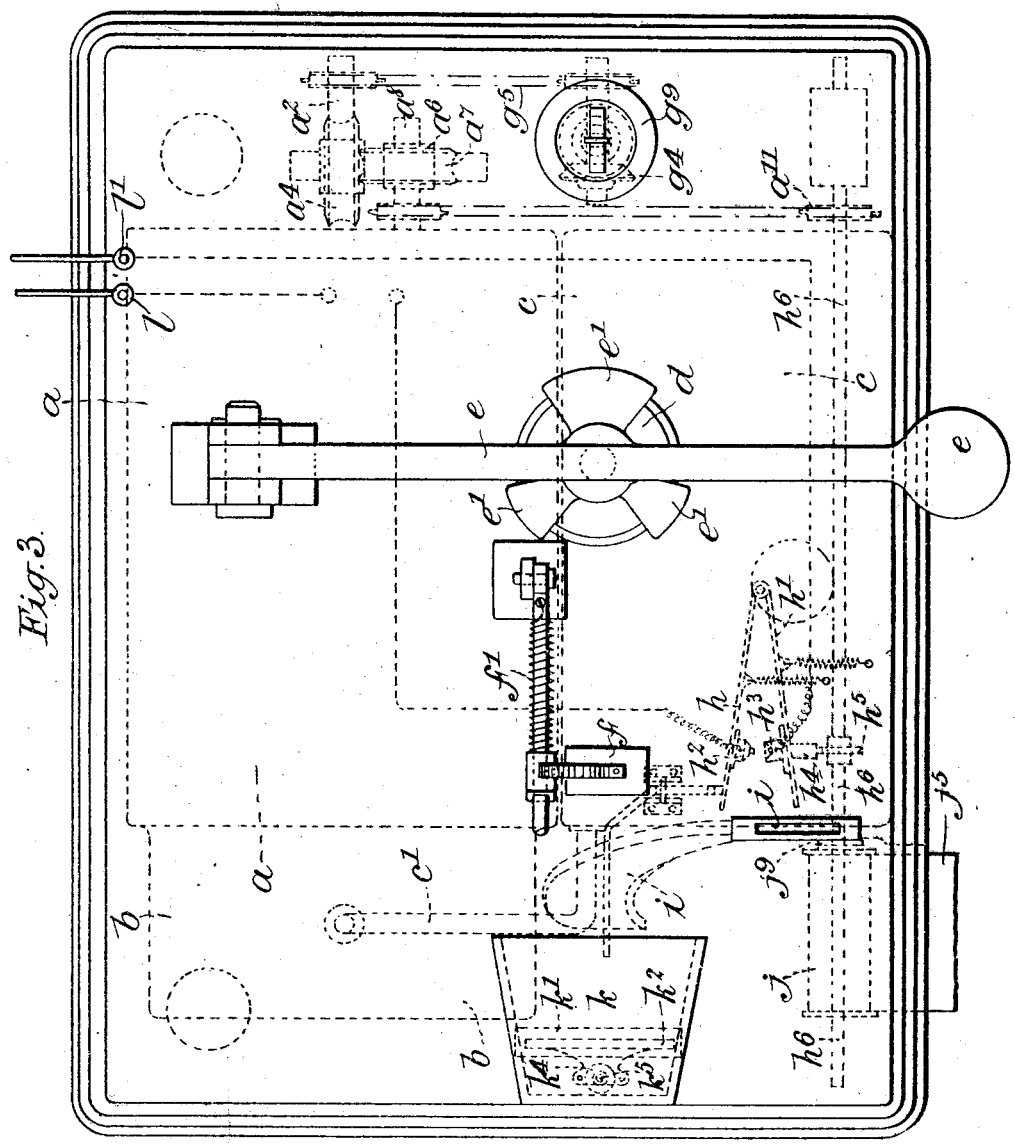
Figure 4:
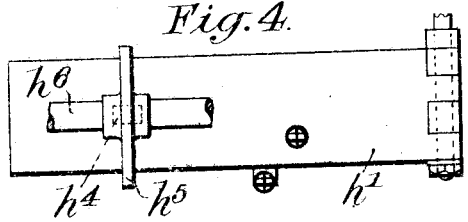
Figure 5:
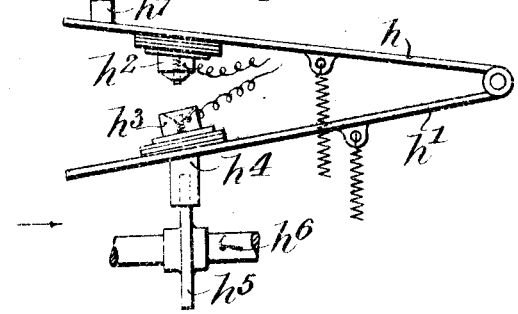
Figure 6:
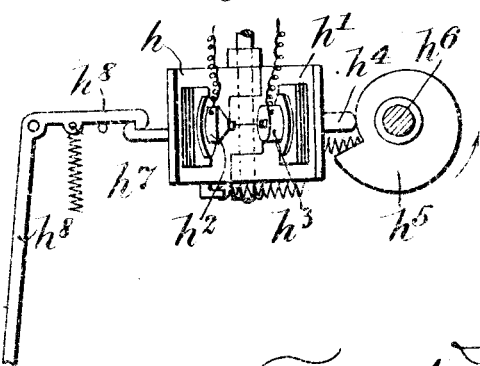
Figure 12:
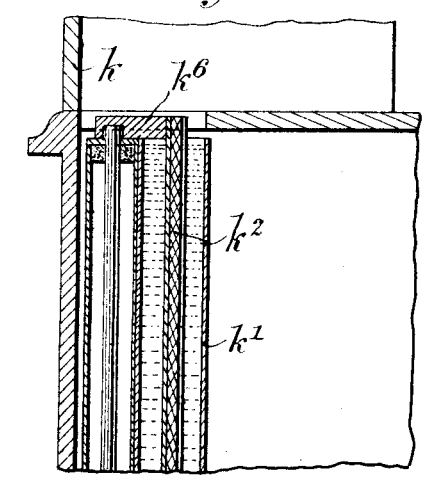
Figure 13:
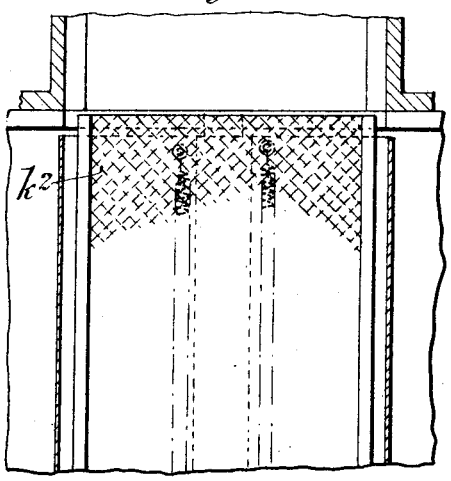
Figure 14:
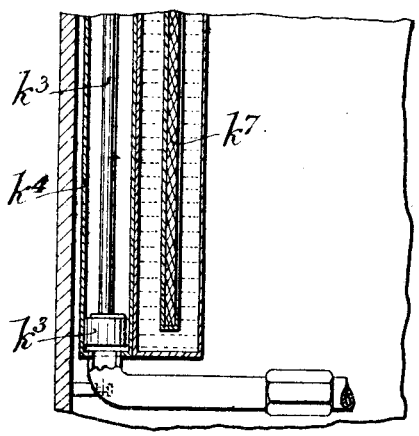
Figure 15:
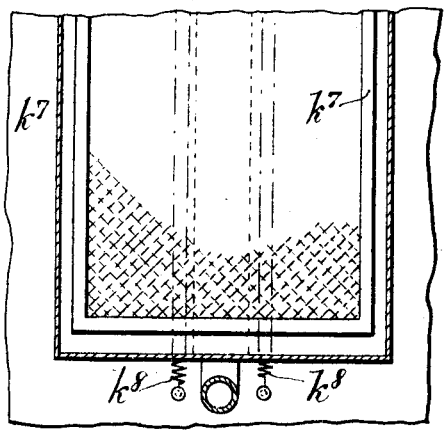

The accompanying sheets of illustrative drawings illustrate a practical form of this invention, Figures 1, 2 and 3 being front elevation, end elevation and plan respectively of the machine. Figs. 4, 5 and 6 are elevation, plan, and end views respectively of the switch gear for starting and stopping the motor. Figs. 7, 8 and 9 are two elevations and a section of the curved coin guide. Fig. 10 is a sectional elevation pipe cleaning nozzle and valve. Fig. 11 is a similar view of the mechanical scraper. Figs. 12, 13 and 14 are two sectional elevations and sectional plan of the apparatus for catching and deodorizing the matter blown from the pipe. Fig. 15 is a sectional elevation showing the paper feeding mechanism.

Now according to this invention the motor $a$ is rigidly connected to the pump or compressor, and the set is mounted on a shock absorbing base $a'$. The air reservoir $c$ is connected to the compressor $b$ by a suitable pipe $c'$, and is provided with a suitable blow-off valve $c^2$ to prevent excess of pressure beyond any desired predetermined limit. Directly above the reservoir $c$ the air nozzle $d$ is arranged and provided with a valve $d'$ whereby the air may be allowed to pass on applying a downward pressure thereto. This valve comprises a cylindrical head $d^2$ in which a valve seat with a valve $d'$ normally pressed thereon from the inside by a spring $d^3$ are provided. This head $d^2$ is surrounded by a cap $d^4$ which can slide thereon, and is normally held up by the spring $d^5$, and is provided with an internal cross bar $d^6$ by means of which the valve $d'$ can be opened by a downward movement of the cap $d^4$. The upper part of the cap $d^4$ is provided with a conical rubber washer $d^7$ forming a nozzle, on which pipe bowls of any size may be placed, and a small valve $d^8$ to normally close the passage against the entrance of dirt.

Above the air nozzle a horizontal lever $e$ with a three clawed grip $e'$ is arranged to hold the pipe being cleaned by its bowl and force the same vertically down on the air nozzle. A spring clamp $f$ slidably mounted on a swiveling rod $f'$ is also provided for firmly holding the mouthpiece and preventing it from being blown out of place.

The bowl scraper $g$ comprises a central steel plate $g'$ with a nose shaped or rounded end, and a pair of expanding steel wings $g^2$ mounted on a vertical shaft $g^3$. This shaft $g^3$ is driven by a pair of bevel wheels $g^4$, and a chain $g^5$ from the motor shaft $a^2$. The bevel wheels are inclosed in a case $g^6$ in order that the matter which is scraped from the pipe bowl may not reach the gear, but be conveyed down the pipe $g^7$ surrounding the shaft $g^3$ to the receiving box $g^8$. A cylindrical guard $g^9$ is arranged around the scraper which can be pressed down by the pipe bowl against the action of a spring $g^{10}$ which normally holds up the guard around the scraper thus protecting the same.

The starting and stopping switch gear for the motor is shown in Figs. 4, 5 and 6, and comprises a pair of spring controlled pivoted levers $h$ $h'$ bearing contacts $h^2$, $h^3$ respectively. The lever $h'$ is provided with a projection $h^4$ adapted to bear against the snail cam $h^5$ which is mounted on a shaft $h^6$ connected by a reducing gear to the motor shaft $a^2$. The other lever $h$ is normally held back against the action of its spring by a catch $h^7$, and the pawl on the short arm of an angle lever $h^8$. The other arm of this lever $h^8$ projects under the lower end of the coin guide in such a way that a coin emerging therefrom moves the lever, and thus releases the lever $h$ and allows its contact $h^2$ to fall against contact $h^3$, hence completing the circuit and starting the motor. The rotation of the cam $h^5$ pushes both the levers $h$ $h'$ back together until the lever $h$ gets caught by the pawl on the lever $h^8$ on the completion of a revolution of the cam $h^5$, after which the projection $h^4$ falls to the low part of the cam, thus causing the lever $h'$ to fly back to break the circuit and stop the motor.

The coin guide $i$ illustrated in Figs. 7, 8 and 9 is of the usual type comprising a curved metal sheet bent to hang obliquely with the underside cut away for the lower portion of its length to leave flanges $i'$ at its sides to retain pennies, and to allow half pennies to fall out of the guide. This arrangement prevents the machine being operated by undersized coins. A box $i^2$ is provided under the coin guide for the purpose of collecting the coins inserted into the machine.

The reducing gear by which the shaft $h^6$ is driven from the motor shaft is seen in Figs. 1, 2 and 3, in which a worm $a^3$ is shown on the motor shaft $a^2$ driving a worm wheel $a^4$ on a countershaft $a^5$. This countershaft $a^5$ bears another worm $a^6$ driving another worm wheel $a^7$ on a shaft $a^8$. On this shaft $a^8$ a sprocket wheel $a^9$ is mounted, and a chain $a^{10}$ from this drives a similar sprocket wheel $a^{11}$ on the shaft $h^6$. By this means the motor is allowed ample time for running between the operations of closing and opening the circuit.

The paper feeding mechanism is illustrated in Fig. 15, and comprises a roller $j$ with flanged ends $j'$ mounted on the shaft $h^6$, and a roller $j^2$ which is pressed against the roller $j$ by springs $j^3$ in the supporting brackets $j^4$. Between these rollers the paper $j^5$ is fed outward from the roller $j^6$. The paper emerges from between the lip $j^7$ and the pivoted snipping knife $j^8$, the latter of which is closed down onto the former on the completion of the feeding operation by the cam $j^9$ on the shaft $h^6$. This snipping knife facilitates the tearing off of the paper, and prevents the delivery of more than the desired amount. The paper supplied in this way may bear suitable advertisements. The shaft $h^6$ also carries a revolution counting mechanism which records the number of operations performed by the machine, and thus acts as a check to the money received in the box $i^2$.

On the top of the machine a hood $k$ is arranged for the purpose of catching the matter removed from the pipe in the blowing operation. Below this hood a tank $k'$ is arranged containing a deodorant, in which an absorbent pad $k^2$ is normally immersed. This is raised within the hood $k$ during the blowing operation by the action of the compressed air on the piston $k^3$ in the cylinder $k^4$, which is connected to the reservoir $c$. The piston $k^3$ is connected by a rod $k^5$ to the bar $k^6$ bearing the frame $k^7$, in which the pad $k^2$ is arranged. This pad is raised during the air blowing operation, and after catching the matter removed from the pipe is drawn back into the tank by the springs $k^8$.

The electrical circuit is formed by the simple wiring of the electric motor, in series, with the contacts on the contact making device and the ends of the circuit are connected to the terminals $l\ l'$.

Although I have shown and described my invention, in detail, I do not wish to be limited to the precise construction shown except for such limitations as the claims may import.

I claim:—

1. A pipe cleaning machine comprising in combination, a casing and means therein for supplying air under pressure, an air nozzle on said casing connected with said air supply means, said nozzle having a pipe engaging discharge end and means whereby pressure on said nozzle serves to open the same to the discharge of air therethrough, mechanism for clamping a smoking pipe on said nozzle with the pipe stem disposed in a given position, an absorbent pad, and mechanism operated by said air supply means for projecting said pad into the path of discharge from the stem of said pipe, substantially as described.

2. A pipe cleaning machine comprising in combination, a casing and means therein for supplying air under pressure, an air nozzle on said casing connected with said air supply means, said nozzle having a pipe discharge end and means whereby pressure on said nozzle serves to open the same, mechanism for clamping a pipe on said nozzle with the pipe stem in a given position, and absorbent means out of contact with the pipe but disposed in the path of discharge from the pipe stem, substantially as described.

3. A pipe cleaning machine comprising in combination, a casing, an air compressor and air tank in said casing, a motor for driving said compressor, an air nozzle connected with said tank and adapted to be opened by downward pressure of a pipe thereon, a pipe scraping means on said casing, and driving connection between said scraping means and said motor, substantially as described.

4. A pipe cleaning machine comprising in combination, a casing having means for supplying air under pressure, a pipe nozzle communicating with said means and comprising a hollow head provided with a valve adapted to be closed by the air pressure, a spring actuated cap slidably mounted on said head and having means for unseating said valve upon downward movement of the cap, a conical nozzle of yielding material disposed on said cap and adapted to fit the bowl of a pipe, and a gravity acting valve normally closing said nozzle, substantially as described.

5. A pipe cleaning machine comprising in combination, a casing having a prime mover therein, a pipe cleaning device on said casing comprising a rotary scraper having a shaft and gear connection with said prime mover, a casing surrounding said gear connection, a second casing surrounding said first casing and providing a discharge passage for the scrapings, and a spring pressed guard slidably connected with said outer casing and adapted to be pressed down by a pipe to permit of operative engagement of the pipe with the scraper, substantially as described.

In testimony whereof I have affixed my signature, in presence of two witnesses.

FREDERICK HUDSON SHEPHERD SHEPHERD.

Witnesses:
O. J. WORTH,
C. P. LIDDON.